Nov. 18, 1941. J. G. HOWARD 2,262,939
ADJUSTABLE TRIPOD LEG
Filed May 3, 1941
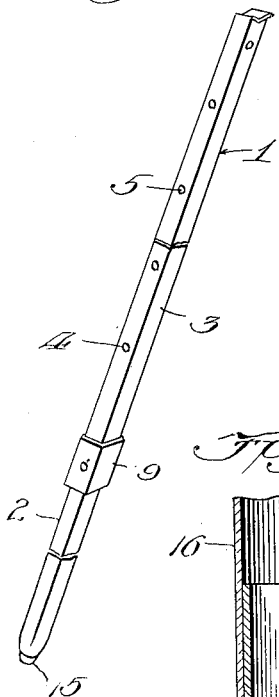
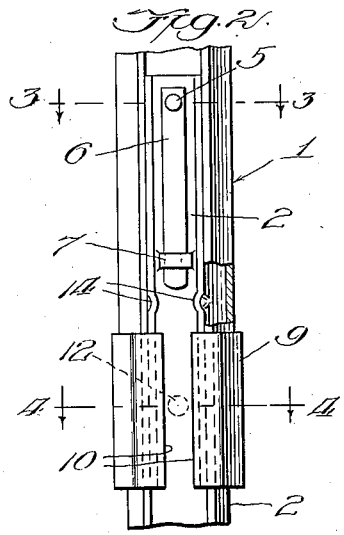
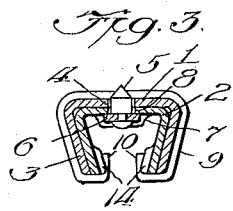
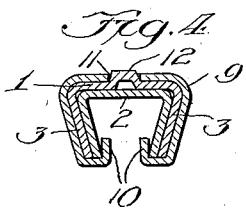
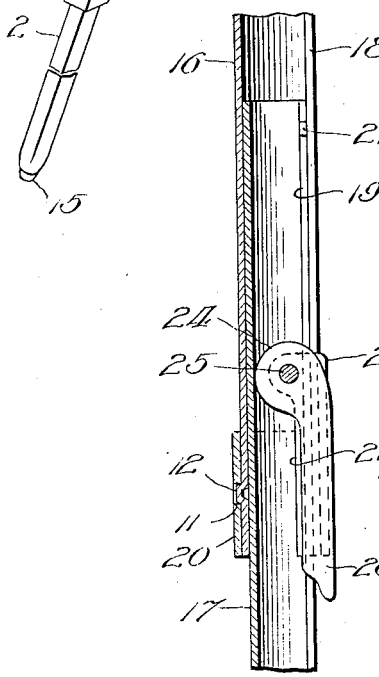
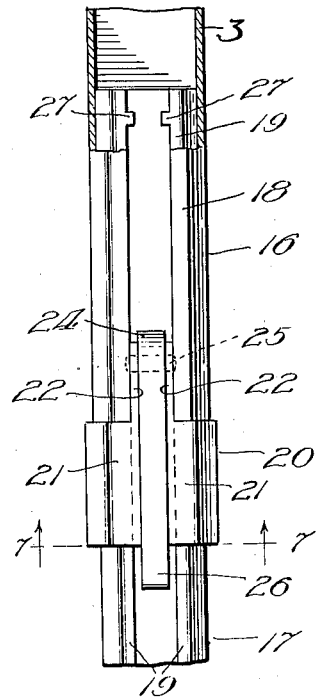
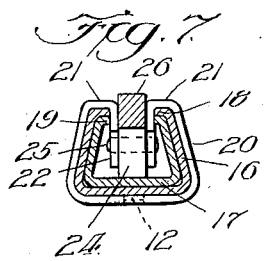
Inventor:
Julius G. Howard,
by Wm. F. Freudenreich,
Atty.

Patented Nov. 18, 1941

2,262,939

UNITED STATES PATENT OFFICE 2,262,939

ADJUSTABLE TRIPOD LEG

Julius G. Howard, Chicago, Ill.

Application May 3, 1941, Serial No. 391,673

9 Claims. (Cl. 248—191)

In my prior application, Serial No. 360,984, filed October 12, 1940, I have illustrated a tripod having a novel form of leg. The present application is based on that leg and a slight modification thereof, and is therefore a partial continuation of the aforesaid application.

The common practice in the construction of adjustable metal legs for light tripods is to employ tubular sections arranged in telescopic relation to each other. Such legs are inexpensive and rather heavy.

The object of the present invention is to produce an all metal adjustable leg for a tripod or the like which shall be composed of metal channels instead of tubes so as to be light and yet strong, and which shall require only a minimum number of operations in the manufacture of the same so as to keep the manufacturing cost much lower than is the case where metal tubing is employed.

When a smaller channel-shaped bar is slidably fitted in a larger, similar bar, some means must be provided to prevent separation of the two bars through the open side of the trough or channel in the larger bar. In accordance with my invention, instead of resorting to fittings for this purpose, I so shape the bars that the sides or flanges converge toward each other, making the open top of the trough or channel narrower than the bottom. This necessitates the assembly of the plural sections through endwise movements and, of course, prevents separation of the sections from each other in any other direction than a longitudinal one. The only fitting that is needed is one designed to reenforce the lower end of the upper section, and this I so fasten that it is automatically secured in place by the mere act of forcing it on the leg section, without the use of separate fastenings or screw threaded parts.

The only other attachment that is required is one to hold the leg in any desired adjusted condition, and the present invention may be said to have for a subsidiary object a simple and inexpensive means for locking the sections of the leg together without the use of nuts or bolts or other screw-threaded parts.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a perspective view of a leg embodying the present invention; Fig. 2 is a view, on a larger scale, showing the inner side of a fragment of the leg, namely the overlapping portions of the two sections when the leg is fully extended; Figs. 3 and 4 are sections taken respectively on line 3—3 and 4—4 of Fig. 2; Fig. 5 is a central longitudinal section of a slightly modified form of leg, illustrating a different locking means, only a fragment of the leg being shown, as in Fig. 2; Fig. 6 is a view similar to Fig. 2, illustrating the modification appearing in Fig. 5; and Fig. 7 is a section on line 7—7 of Fig. 6.

In the drawing there is illustrated a leg made in two sections, an upper section 1, and a lower section 2 and, for the sake of brevity, the detailed description will be confined to this particular type, although a larger number of sections may, of course, be employed.

Referring to Figs. 1 to 4 of the drawing, it will be seen that the upper section 1 is in the form of a light channel-shaped metal bar whose flanges 3 converge toward each other from the web or bottom of the channel to the open side. The second or lower section 2 is in the form of a similar channel-shaped member which fits slidably into the member 1. The web portion of the upper section contains a series of holes distributed lengthwise of the same, and the member 2 is provided near its upper end with a yieldingly held pointed pin 5 that may enter any one of the openings in the corresponding upper leg member and lock the two sections together. In the arrangement shown, the pin 5 is secured to and projects from the upper end of a flat leaf spring 6, the lower end of which is inserted underneath and held by a little transverse loop or strand 7 punched out of the web portion of the lower leg section; the spring lying within the channel or trough of the leg member and against the inner face of the web portion of the section 2. In order that the pin may reach the holes 4, it is set loosely within a hole 8 punched in the web portion against which it lies. Normally the spring presses the web portion out through the hole 8 as far as it will go. If the pin happens to be registering with one of the holes 4, it will move out into the same with its pointed end projecting in whole or in part on the outside of the member 1. Now, until the pin is again pushed out of the hole 4, it locks the two sections securely together so that no relative lengthwise movement between the two sections of a leg can take place without shearing the pin or mutilating the metal of the leg. When it is desired to collapse a leg or to extend the same, all that need be done is to press lightly on the pointed end of the pin and then exert a push or pull, as the case may be, upon the two leg sections. The pointed or conical end of the pin serves as a wedge or inclined plane by which the pin is forced clear out of the hole 4 in which it happens to be located, and it rides along the inner face of the web of the upper leg section until brought into registration with another of the holes. If the relative lengthwise movements between the leg sections are effected quickly, after the pin has once been released, the pin will not drop into any of the holes which it must pass in order to bring the leg into the proper condition of extension or contraction.

In order to strengthen and reenforce the lower ends of the main leg sections, I place upon each a ferrule-like part 9 which, instead of being continuous, is simply a U-shaped element fitting against the outer faces of the web and flange portions of the leg member and having its free ends 10 bent laterally across the long free edges of the main channel-shaped leg member and then inwardly or downwardly at a distance from such long edges sufficient to provide room for the flanges of the lower leg section 2. The member 9 can conveniently be secured by simply providing it with a hole 11 at the middle, and pressing into the web portion of the upper leg member an outward projection 12 adapted to fit into this hole. The arrangement permits the member 9 to snap into interlocked relation to the upper leg member upon simply slipping it into its proper location.

There is nothing except friction and the presence of the pin 5 in one of the holes 4 to keep the lower leg section from being withdrawn from the upper section. In order to avoid accidental separation of the two sections of the leg from each other, I have deformed the flanges of the lower sections adjacent to their long free edges and only a short distance from their upper ends, to produce little bosses or lugs 14 that project into the trough of the leg member. When the lower leg section is pulled down far enough, the bosses or lugs 14 strike against the upper edges of the inturned portion 10 of the ferrule 9 and prevent further downward movement.

As shown in Fig. 1, the lower end of the leg sections 2 may be deformed so as to permit a suitable button or foot 15 to be attached.

In Figs. 5 to 7 I have illustrated a different form of locking means for the leg sections which eliminate the holes 4. Since these holes are not required, it enables me to use an inexpensive sheet metal which, after being formed into channel bars, can be enamelled without fear of injury to the enamel in assembling or using the leg. In this form of leg, the two sections 16 and 17 may be of the same sizes and shapes as the members 1 and 2, respectively, or each may have narrow inturned flanges 18 and 19, respectively, following the free long edges of the sides of the channels. The ferrule-like part 20 is similar to and secured in place in the same manner as the element 9 in the other form. However, the downturned flanges 21, corresponding to the flanges 10 of the element 9, are extended upwardly to produce elongated ears 22. Between these ears is positioned a locking dog in the form of a cam 24 rotatably held in place by a pin or journal 25 passing through the same and through the ears. The dog is provided with a downwardly-projecting handle or finger piece 26 that extends past the lower end of the member 20. This enables the user to insert a fingertip under the free end thereof and swing the handle or finger piece outwardly and upwardly.

It will, of course, be understood that when the dog is in the position shown in Fig. 5, it clamps the web of the lower leg section against the web of the upper section and locks the two sections securely together. On the other hand, when the dog is turned in the counterclockwise direction the pressure on the web of the lower leg section is released and adjustments to lengthen or shorten the leg may be made. It will also be seen that downward pressure on the leg, when in locked condition, tends to turn the dog in the clockwise direction, thus increasing the locking effect of the dog. Consequently, the greater the bearable load on the leg, the more certainly are the two sections held against relative lengthwise movements.

As in the other form of leg, the lower section is provided, near its upper end, with lugs to engage with the part 20 when the leg is expanded, thereby preventing the two sections from pulling apart. These lugs, indicated at 27, project from the flanges 19 and are adapted to strike against the end edges of the ears 22.

It will thus be seen that I have produced a light, sturdy, adjustable leg which can be firmly held in any adjusted condition; the device comprising only a few simple parts that require no machining; and the assembly of such parts being effected by slipping one piece into or upon another with the single exception of the journal pin for the locking dog which should be headed over somewhat so as not to drop out. Consequently, a camera tripod, for example, containing such legs can be sold to camera users at less than one-half the price received for most of the cheaper tripods heretofore sold; and, furthermore, the tripod is so light and compact that a camera user will not hesitate to carry it with him on picture-taking trips.

While I have illustrated and described with particularity only the single preferred form of my invention, with a single modification, I do not desire to be limited to the exact structural details thus illustrated and described; but intend to cover all forms and arrangements which come within the definitions of my invention constituting the appended claims.

I claim:

1. A leg for a tripod or the like comprising an upper channel-shaped metal member, a lower channel-shaped metal member slidably fitted in the upper member, the side flanges of each of the said members converging toward each other from the bottoms of the channels to the free long edges of the flanges, a U-shaped clip embracing the lower end of the upper member and having the free ends of its arms bent laterally over the adjacent free edges of the flanges of said members, means to lock the said members together in various positions of relative lengthwise adjustment, and lugs on the flanges of the lower member adapted to strike against the upper edges of the inturned arms of said clip when the lower member is pulled down until it overlaps the upper member only a short distance.

2. A leg for a tripod or the like comprising an upper channel-shaped metal member, a lower channel-shaped metal member slidably fitted in the upper member, the side flanges of each of the said members converging toward each other from the bottoms of the channels to the free long edges of the flanges, a U-shaped clip embracing the lower end of the upper member and having the free ends of its arms bent laterally over the adjacent free edges of the flanges of said members, the web element of the said upper member and the adjacent part of the clip having a cooperating hole and boss to effect an interlock through a snap action when the clip is applied to said upper member, means to lock the said members together in various positions of relative lengthwise adjustment, and lugs on the flanges of the lower member adapted to strike against the upper edges of the inturned arms of said clip when the lower member is pulled down until it overlaps the upper member only a short distance.

3. A leg for a tripod or the like comprising an upper channel-shaped metal member, a lower channel-shaped metal member slidably fitted in the upper member, the side flanges of each of the said members converging toward each other from the bottoms of the channels to the free long edges of the flanges, a U-shaped clip embracing the lower end of the upper member and having the free ends of its arms bent laterally over the adjacent free edges of the flanges of said members, a cam dog movably mounted on said clip in the trough of the leg for engagement with the web portion of the lower leg member and clamping it firmly against the upper leg member.

4. A leg for a tripod or the like comprising an upper channel-shaped metal member, a lower channel-shaped metal member slidably fitted in the upper member, the side flanges of each of the said members converging toward each other from the bottoms of the channels to the free long edges of the flanges, a cam dog movably mounted on the lower end and in the trough of said upper leg member for engagement with a part of the lower leg member and clamping it to the upper leg member.

5. A leg for a tripod or the like comprising an upper channel-shaped metal member, a lower channel-shaped metal member slidably fitted in the upper member, the side flanges of each of the said members converging toward each other from the bottoms of the channels to the free long edges of the flanges, a U-shaped clip embracing the lower end of the upper member and having the free ends of its arms bent laterally over the adjacent free edges of the flanges of said members, said free ends of the clip being extended in the form of ears beyond one end of the clip, a cam dog mounted between said ears for turning movements from a position in which it clamps the lower leg member to the upper leg member to a position in which it leaves the lower leg member free to slide lengthwise of the upper member, and a handle device extending from the dog across the length of the clip.

6. A leg for a tripod or the like comprising an upper channel-shaped metal member, a lower channel-shaped member slidably fitted in the upper member, the web portion of the upper member containing a row of holes distributed along the same, the web of the lower member having therein a hole near the upper end adapted to register with any one of the holes in the upper member, depending on the relative lengthwise positions of said members, a pin extending through the hole in the lower member and adapted to extend through any one of the holes in the upper member, and a leaf spring lying against the inner side of the web element of the lower leg member and secured at one end to the pin and fixed at the other element to the latter web element.

7. A leg for a tripod or the like comprising an upper channel-shaped metal member, a lower channel-shaped member slidably fitted in the upper member, the web portion of the upper member containing a row of holes distributed along the same, the web of the lower member having therein a hole near the upper end adapted to register with any one of the holes in the upper member, depending on the relative lengthwise positions of said members, a pin extending through the hole in the lower member and adapted to extend through any one of the holes in the upper member, and a leaf spring lying against the inner side of the web element of the lower leg member and secured at one end to the pin and fixed at the other element to the latter web element, the free end of the pin having a frusto-conical point at least as long as the thickness of the web portion of the upper leg member, and the body portion of the pin being about as long as the combined thicknesses of said web members.

8. A leg for a tripod or the like comprising an upper channel-shaped metal member, a lower channel-shaped metal member slidably fitted in the upper member, the walls forming the flanges of each member converging toward each other from the web of that member to the open side to cause the said members to be held against separation except only in the lengthwise direction, and means to lock said members together in various different relative lengthwise positions.

9. A leg for a tripod or the like comprising an upper channel-shaped metal member, a lower channel-shaped metal member slidably fitted in the upper member, the walls forming the flanges of each member converging toward each other from the web of that member to the open side to cause the said members to be held against separation except only in the lengthwise direction, means to lock said members together in various different relative lengthwise positions, and a U-shaped clip embracing the lower end of the upper leg member and having the free ends of its arms bent laterally over the free edges of the flanges of said leg members.

JULIUS G. HOWARD.